Patented June 23, 1931

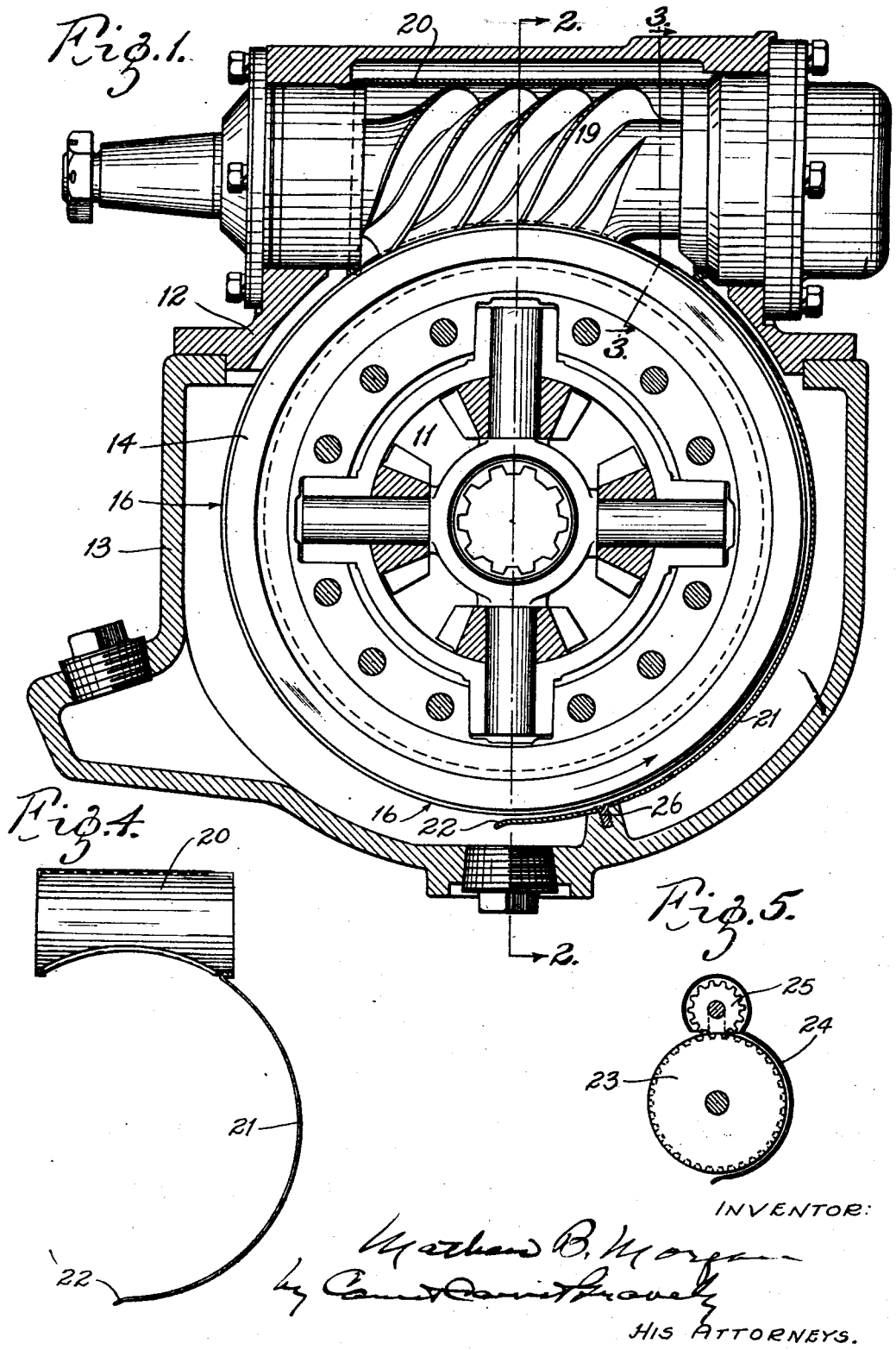

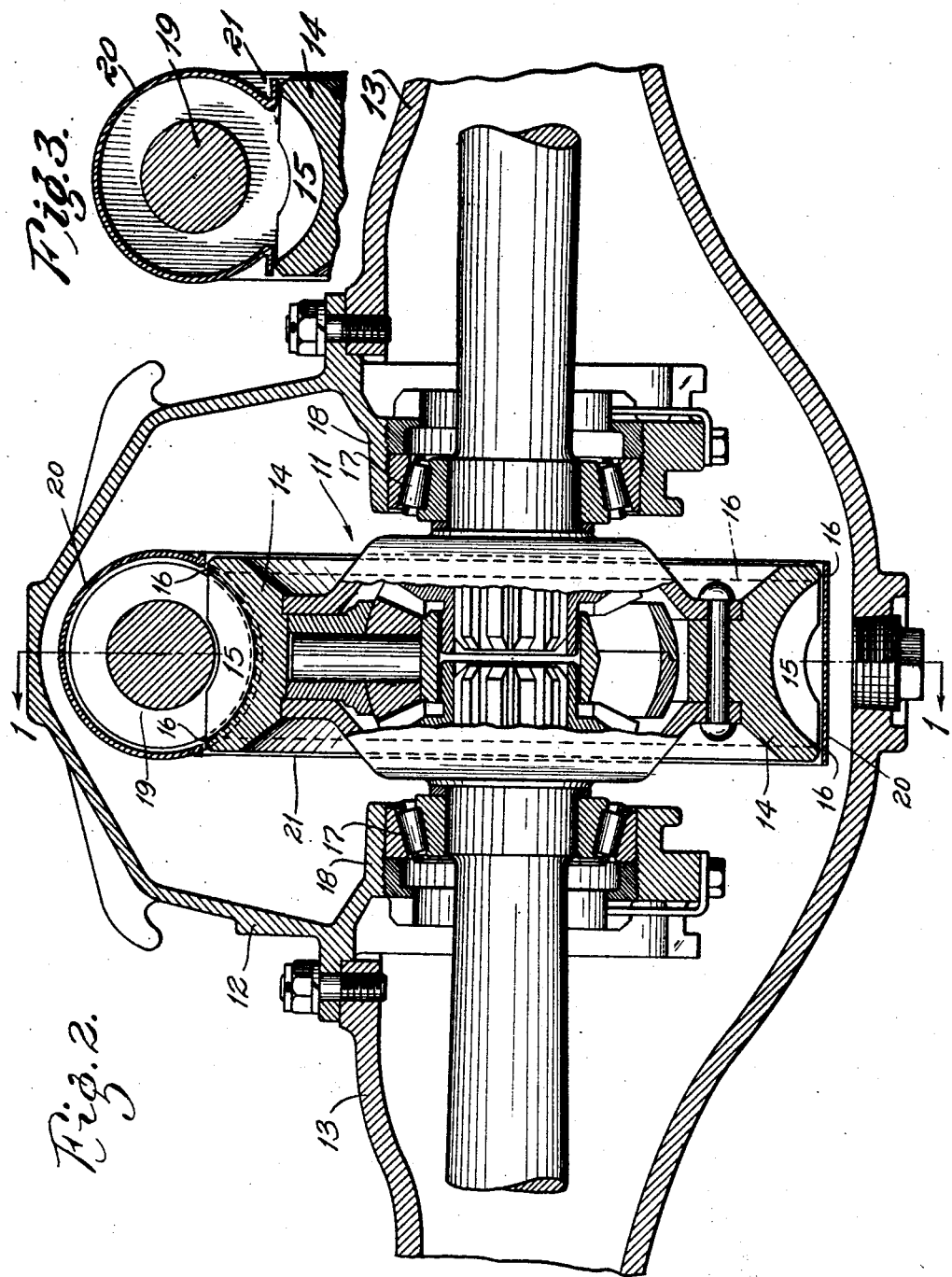

1,811,059

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

SELF-LUBRICATING GEAR SET

Application filed May 17, 1930. Serial No. 453,147.

My invention relates to gear sets and the lubrication thereof, especially worm gearing and has for its principal objects to adapt overhung worm gearing for heavier work than has been practicable heretofore and to provide for the adequate lubrication of the contacting surfaces of the gear set, especially the contacting surfaces of a worm gear and an overhung worm in mesh therewith. Another object is to make the lubricating system independent of the housing for the gearing and independent of the adjustment of the gearing. The invention consists principally in making the tooth spaces of the worm gear terminate short of the side faces of said worm gear, in combination with a cover strip arranged close to the periphery of the worm gear and extending from the oil well of the housing to the worm. It also consists in a casing for the worm with a semicircular extension depending from said casing close to the periphery of the rising side of the worm gear. It also consists in the arrangements and combinations of parts hereinafter described and claimed.

In the accompanying drawings wherein like reference numerals refer to like parts wherever they occur, Fig. 1 is a cross section on the line 1—1 of Fig. 2 of an automotive axle provided with a differential carrier unit embodying my invention, Fig. 2 is a vertical section, on the line 2—2 of Fig. 1, Fig. 3 is a vertical section on the line 3—3 of Fig. 1, Fig. 4 is a detail view of the worm gear casing member; and Fig. 5 is a view of a modification.

In its general features, the construction illustrated in Figs. 1 and 2 is a typical differential gearing 11 mounted in a typical differential carrier 12 ready for application as a unit to a typical automotive housing 13. According to the present invention, the periphery of the worm gear 14 is wider than the length of the spaces 15 between adjacent gear teeth, thus providing continuous cylindrical bands 16 at the opposite ends of such tooth spaces. That is, the tooth spaces are cut in the cylindrical peripheral surface of the worm gear, with the ridges of the teeth flush with said cylindrical end bands. By this arrangement, the tooth spaces constitute pockets that open radially only, and the ends of the teeth are integral with and strongly supported by the continuous end bands. A worm gear of this construction is hereinafter designated as a shrouded worm gear.

In the construction illustrated, the shrouded worm gear 14 constitutes the ring gear of a common type of differential mechanism that is journaled in roller bearings 17 mounted in suitable hangers 18 provided therefor on the differential carrier. The driving worm 19 is suitably housed and mounted in suitable bearings provided there for in the upper portion of the differential carrier 12 in operative relation to the upper part of said worm gear 14. According to the present invention, the top and sides of the worm 19 are enclosed in a cylindrical shell or casing 20 preferably of sheet metal of slightly larger diameter than the worm. Preferably the lower side edges of this casing curve inwardly far enough to overlap the planes of the side faces of the worm gear so that oil dripping from said edges will drop onto the teeth or into the pockets of the worm gear. The end wall of said shell, at the rising side of the worm gear, has a semi-cylindrical plate or strip 21 extending from its bottom concentric with and of slightly larger diameter than the worm gear, the lower end of such extension reaching below the normal oil level of the oil well of the axle housing. The lower end 22 of the semi-cylindrical extension that surrounds the worm gear hereinafter called the gear cover, is shaped or arranged for the purpose of better admitting oil between said gear and said gear cover. For instance, said end may diverge from the gear, as shown.

By the arrangement above described, the lower portion of the worm gear dips into the oil at the bottom of the housing, so that each tooth space constitutes a pocket which is filled with oil before it reaches the end of the gear cover. As each pocket rises, it loses no oil until such pocket emerges from the main body of oil, and then only such portion of its oil as may run out between the periphery of the gear and the gear cover. In fact, the gear cover may actually bear against the periphery of the worm gear, especially the cylindrical end bands thereof, and thus minimize the leakage of oil from the gear pockets. Therefore each successive pocket reaches the worm fairly well filled with oil.

The oil in the pocket of the gear is thus carried directly to the worm, and any excess oil will be flung from the worm against its casing, whence it spatters and drips back onto the more advanced portions of the worm. In this way, the contacting surfaces of the worm and gear wheel are thoroughly lubricated; whereas heretofore, in automotive practice there has been a tendency for worm gearing subjected to heavy work to scrape off and squeeze out the lubricant close to the region where the worm and gear begin their contact, leaving their regions of later contact to run dry and wear excessively. This tendency has been a limiting factor in the power applicable to worm gearing; whereas the present system of lubrication overcomes the previous difficulties and in connection with the use of a shrouded worm gear, makes it feasible to build stronger worm gearing and apply much greater power than has been practicable heretofore in automotive vehicles.

The worm casing is mounted on the worm or on the portions of the differential carrier that support the worm; and is thus independent of the axle housing and of the worm gear. Consequently, the adjustment of the worm gear and its bearings longitudinally of its axis does not disturb the operative relation of the worm gear and the gear cover or extension of the worm casing that hugs said worm gear.

While the invention is especially applicable to worm gearing and has been described above as applied to worm gearing, it is also applicable to other forms of gearing, such as the spur gearing illustrated in Fig. 5. In this construction, the lower gear 23, which runs in oil, is a shrouded gear, and the gear cover 24 hugs it closely from the oil well to a point close to the point of contact with the upper pinion 25.

What I claim is:

1. The combination with a shrouded gear, an overhung driving member engaging said gear, a casing snugly enclosing said driving member and having a semi-cylindrical extension concentric with said gear and wholly beyond but adjacent to the periphery thereof.

2. The combination with a shrouded worm gear, an overhung worm engaging said gear, and a casing snugly enclosing the top and sides of said worm and having a semi-cylindrical extension concentric with the worm gear and wholly beyond but adjacent to the periphery thereof.

3. The combination with a worm gear and an overhung worm engaging said gear, of a casing close to said worm and enclosing the top and sides thereof throughout the region of contact with said gear, the lower edges of said casing overlapping the side faces of said gear to guide oil into the upper tooth spaces thereof.

4. The combination of an axle housing, a differential gear unit supported by and extending into said housing and comprising a shrouded gear, an overhung driving member and a casing enclosing said driving member and having a semicircular extension close to and enclosing the rising side of said gear, said casing having drip edges above the gear and arranged to drop oil thereon.

5. The combination with an axle housing of a differential gear unit supported by and extending into said housing and comprising a shrouded worm gear, an overhung worm and a casing enclosing the top and sides of said worm and having a semicircular extension close to and enclosing the rising side of said worm gear, the lower edges of said casing overlapping the side faces of said gear to guide oil into the upper tooth spaces thereof.

6. The combination with an axle housing of a differential gear unit supported by and extending into said housing and comprising a shrouded worm gear, an overhung worm and a casing enclosing the top and sides of said worm and having a semicircular extension close to and enclosing the rising side of said worm gear, the lower end of said extension diverging from said gear, the lower edges of said casing overlapping the side faces of said gear to guide oil into the upper tooth spaces thereof.

Signed at Detroit, Michigan, this 12th day of May, 1930.

MATHEW B. MORGAN.